United States Patent
Tanabe (10) Patent No.: US 9,041,363 B2
(45) Date of Patent: May 26, 2015

(54) WINDOWLESS H-BRIDGE BUCK-BOOST SWITCHING CONVERTER

(71) Applicant: Analog Devices Technology, Hamilton (BM)

(72) Inventor: Hirohisa Tanabe, Yokohama (JP)

(73) Assignee: Analog Devices Global (BM)

( * ) Notice: Subject to any disclaimer, the term of this patent is extended or adjusted under 35 U.S.C. 154(b) by 100 days.

(21) Appl. No.: 13/856,611

(22) Filed: Apr. 4, 2013

(65) Prior Publication Data

US 2014/0084883 A1    Mar. 27, 2014

Related U.S. Application Data

(60) Provisional application No. 61/704,195, filed on Sep. 21, 2012, provisional application No. 61/772,038, filed on Mar. 4, 2013.

(51) Int. Cl.
*G05F 1/24* (2006.01)
*H02M 3/158* (2006.01)

(52) U.S. Cl.
CPC ................... *H02M 3/1582* (2013.01)

(58) Field of Classification Search
USPC .......................................... 323/259
See application file for complete search history.

(56) References Cited

U.S. PATENT DOCUMENTS

| | | | |
|---|---|---|---|
| 7,495,419 B1 * | 2/2009 | Ju ................................. | 323/259 |
| 7,570,033 B1 * | 8/2009 | Ju ................................. | 323/259 |
| 7,768,245 B1 * | 8/2010 | De Cremoux ................ | 323/259 |
| 7,956,586 B2 * | 6/2011 | Nagai et al. .................... | 323/259 |
| 8,018,212 B1 * | 9/2011 | Petricek ......................... | 323/259 |
| 8,269,471 B2 * | 9/2012 | Singnurkar ................... | 323/259 |
| 8,350,543 B2 * | 1/2013 | Loikkanen et al. ........... | 323/259 |

* cited by examiner

*Primary Examiner* — Jue Zhang
(74) *Attorney, Agent, or Firm* — Schwegman Lundberg & Woessner, P.A.

(57) ABSTRACT

A "windowless" H-bridge buck-boost switching converter includes a regulation circuit with an error amplifier which produces a 'comp' signal, a comparison circuit which compares 'comp' with a 'ramp' signal, and logic circuitry which receives the comparison circuit output and a mode control signal indicating whether the converter is to operate in buck mode or boost mode and operates the primary or secondary switching elements to produce the desired output voltage in buck or boost mode, respectively. A 'ramp' signal generation circuit operates to shift the 'ramp' signal up by a voltage Vslp(p−p)+Vhys when transitioning from buck to boost mode, and to shift 'ramp' back down by Vslp(p−p)+Vhys when transitioning from boost to buck mode, thereby enabling the converter to operate in buck mode or boost mode only, with no need for an intermediate buck-boost region.

16 Claims, 10 Drawing Sheets

WINDOWLESS H-BRIDGE BUCK-BOOST SWITCHING CONVERTER

RELATED APPLICATIONS

This application claims the benefit of provisional patent application No. 61/704,195 to Hirohisa Tanabe, filed Sep. 21, 2012, and to provisional patent application No. 61/772,038 to Hirohisa Tanabe, filed Mar. 4, 2013.

BACKGROUND OF THE INVENTION

1. Field of the Invention

This invention relates generally to switching power converters, and more particularly to buck-boost switching converters.

2. Description of the Related Art

A switching converter receives an input voltage VIN and produces an output voltage VOUT. One type of switching converter known as a 'buck-boost' converter is capable of operating in either a buck mode in which the output voltage produced is less than the input voltage (VOUT<VIN), a boost mode in which VOUT>VIN, or in a buck-boost mode in which VOUT is nearly equal to VIN.

Figure 1A:
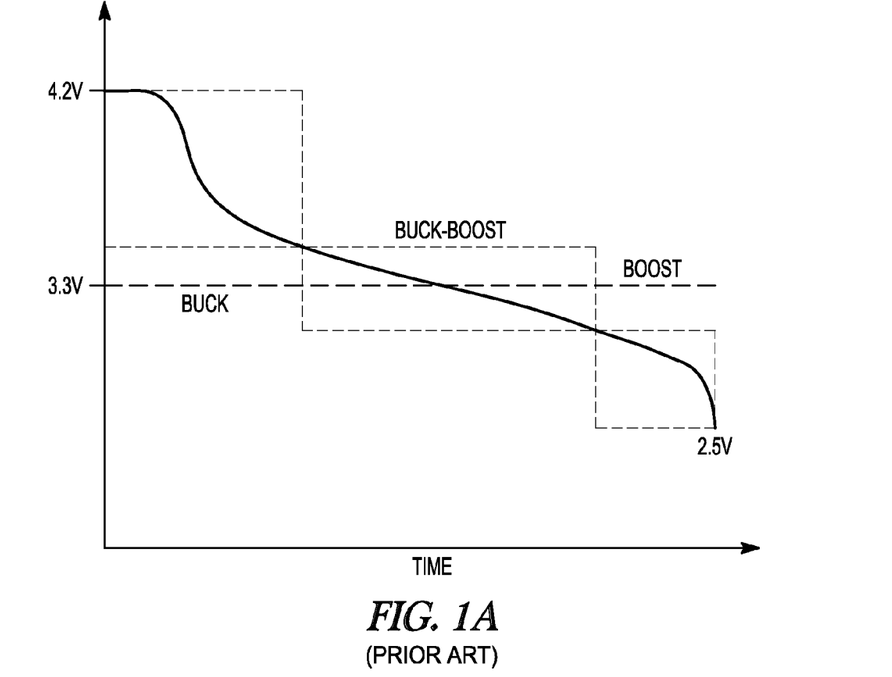
FIG. 1a is a diagram illustrating switching converter operating mode vs. input voltage for a conventional buck-boost switching converter.

One suitable application of a buck-boost converter is in a battery-powered system, in which input voltage VIN decreases over time; this is illustrated in FIG. 1a. Input voltage VIN might be provided by, for example, a lithium-ion battery, the voltage of which decays from 4.2 v to 2.5 v over time. If the circuitry being powered by the switching converter requires an operating voltage of, for example, 3.3 v, it is beneficial to use a buck-boost converter. When the battery voltage is above 3.3 v by a minimum amount, the converter operates in buck mode. Similarly, when the battery voltage is below 3.3 v by a minimum amount, the converter operates in boost mode. However, if the battery voltage is just slightly above 3.3 v, the converter is typically unable to continue working in buck mode, and must switch to buck-boost mode operation. Similarly, boost mode typically cannot be sustained when the battery voltage is just slightly below 3.3 v, requiring the converter to switch to buck-boost mode operation.

Figure 1B:
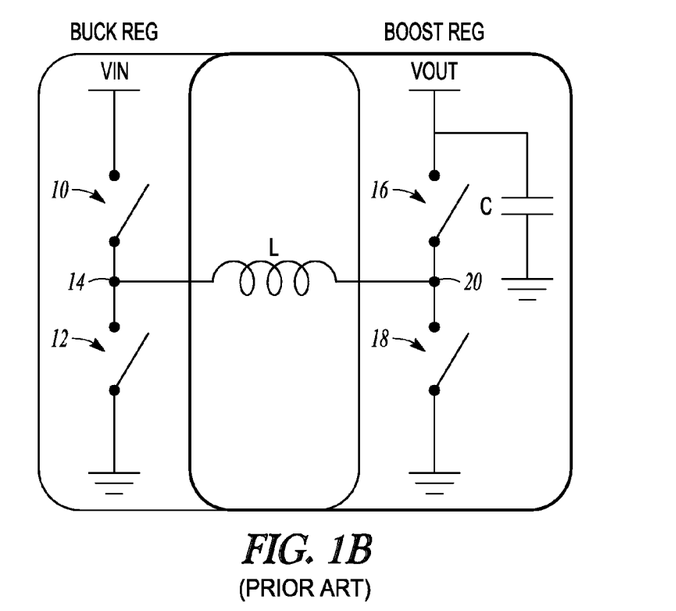
FIG. 1b is a schematic diagram of a known H-bridge configuration as is typically used with a buck-boost switching converter.

FIG. 1b shows an "H-bridge" circuit that is commonly used as the final stage of a buck-boost power converter. Two switching elements 10, 12 are connected together at a node 14, between VIN and a circuit common point, and two switching elements 16, 18 are connected together at a node 20, between VOUT and the circuit common point. An inductor L is connected between nodes 14 and 20, and a filter capacitor C is typically connected between VOUT and circuit common. In buck mode, switching element 16 is closed and switching elements 10 and 12 are switched on and off in complementary fashion, typically with pulse-width modulated (PWM) signals, to produce a desired VOUT. In boost mode, switching element 10 is closed and switching elements 16 and 18 are switched in complementary fashion to produce the desired VOUT. However, in buck-boost mode, all four switching elements must be switched to produce the desired VOUT.

A buck-boost mode is conventionally used because a direct transition between buck mode and boost mode can cause a discontinuity in the output voltage. There is a drawback to this method of operation, however: due to the need to be switching all four switching elements, efficiency is poor when operating in buck-boost mode.

SUMMARY OF THE INVENTION

A "windowless" H-bridge buck-boost switching converter is presented which addresses the problems discussed above.

The present switching converter employs primary and secondary high and low side switching elements and an inductor arranged in an H-bridge configuration, with the top of the primary high side switching element being the input node for the converter and the top of the secondary high side switching element being the output node for the converter. The converter includes a regulation circuit arranged to operate the primary or secondary high and low side switching elements as needed to produce a desired output voltage at the output node. The regulation circuit includes an error amplifier arranged to produce a 'comp' signal which varies with the difference between a voltage proportional to the output voltage and a reference voltage, a first comparison circuit which compares 'comp' with a 'ramp' signal and toggles an output when 'ramp' increases above or falls below 'comp'. The regulation circuit also includes logic circuitry which receives the output of the comparison circuit and a mode control signal indicating whether the converter is to operate in buck mode or boost mode. When buck mode operation is indicated, the logic circuitry switches the primary high and low side switching elements to produce the desired output voltage, and when boost mode operation is indicated switches the secondary high and low side switching elements to produce the desired output voltage.

The present converter also employs a ramp signal generation circuit which includes a current sensing circuit that provides an output which varies with the current conducted by one of the high side switching elements, slope compensation and/or offset circuitry which produces an output that is summed with the output of the current sensing circuit to produce a voltage 'rampl', a fixed voltage Vhys which is referenced to voltage 'rampl' to produce a voltage 'ramph' given by 'rampl'+Vhys, and a switching circuit arranged to provide voltage 'rampl' to the first comparison circuit as signal 'ramp' during buck mode operation and to provide voltage 'ramph' to the first comparison circuit as signal 'ramp' during boost mode operation.

The output of the slope compensation and/or offset circuitry is a triangle-shaped slope compensation signal having an amplitude of Vslp(p–p) in buck mode, and the peak DC voltage of the slope compensation signal in boost mode.

A second comparison circuit compares 'comp' signal with a 'ramp#' signal and toggles an output when 'ramp#' increases above or falls below 'comp'. The switching circuit is further arranged to provide voltage 'rampl' to the second comparison circuit as signal 'ramp#' when the mode control signal indicates boost mode operation and to provide voltage 'ramph' to the second comparison circuit as signal 'ramp#' when the mode control signal indicates buck mode operation. Second logic circuitry is arranged to receive the output of the second comparison circuit and to provide the mode control signal in response.

The present arrangement operates to shift the 'ramp' signal up by Vhys+Vslp(p–p) when transitioning from buck to boost mode, and to shift 'ramp' back down by Vhys+Vslp(p–p) when transitioning from boost to buck mode. This enables the converter to operate with only two modes—buck and boost—with no need for an intermediate buck-boost region. As such, the number of mode transitions is reduced, and there are never more than two switching elements being switched—thereby providing improved efficiency. Output voltage discontinuities are also minimized with only two operating modes.

These and other features, aspects, and advantages of the present invention will become better understood with reference to the following description and claims.

DETAILED DESCRIPTION OF THE INVENTION

Figure 2A:
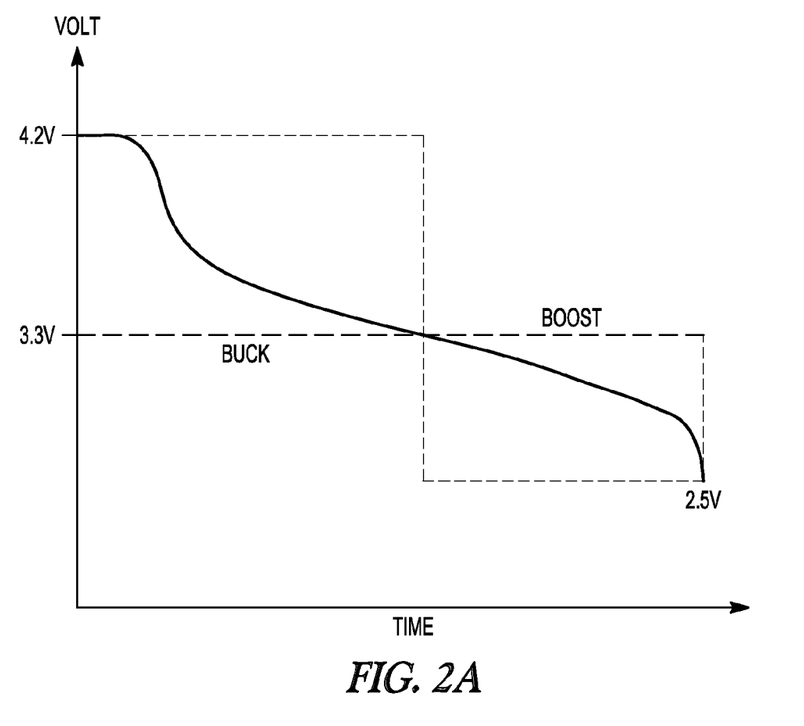
FIG. 2a is a diagram illustrating switching converter operating mode vs. input voltage for a windowless buck-boost switching converter per the present invention.
Figure 2B:
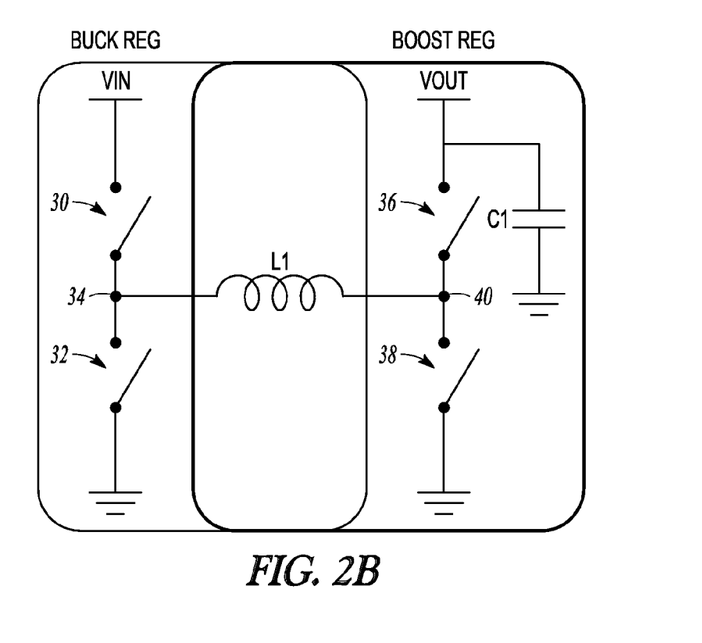
FIG. 2b is a schematic diagram of an H-bridge configuration as might be used with a windowless buck-boost switching converter per the present invention.

A diagram illustrating switching converter operating mode vs. input voltage for a windowless buck-boost switching converter per the present invention is shown in FIG. 2a. The present converter architecture has only 2 operating modes—buck and boost—which serves to reduce efficiency problems found in conventional buck-boost converters, while also minimizing output discontinuities. The converter uses an H-bridge configuration as shown in FIG. 2b, with two switching elements 30, 32 connected together at a node 34 and between VIN and a circuit common point, and two switching elements 36, 38 connected together at a node 40 between VOUT and the circuit common point. An inductor L1 is connected between nodes 34 and 40, and a filter capacitor C1 is connected between VOUT and circuit common. For the present converter, in buck mode, switching element 36 is closed and switching elements 30 and 32 are switched on and off in complementary fashion, typically with pulse-width modulated (PWM) signals, to produce a desired VOUT. In boost mode, switching element 30 is closed and switching elements 36 and 38 are switched in complementary fashion to produce the desired VOUT. At no time are more than two switching elements being switched, thereby improving converter efficiency. The present converter is preferably realized with a true peak current mode buck regulator, a true peak or emulated current mode boost regulator, and a novel method for transitioning between buck mode and boost mode.

Figure 3:
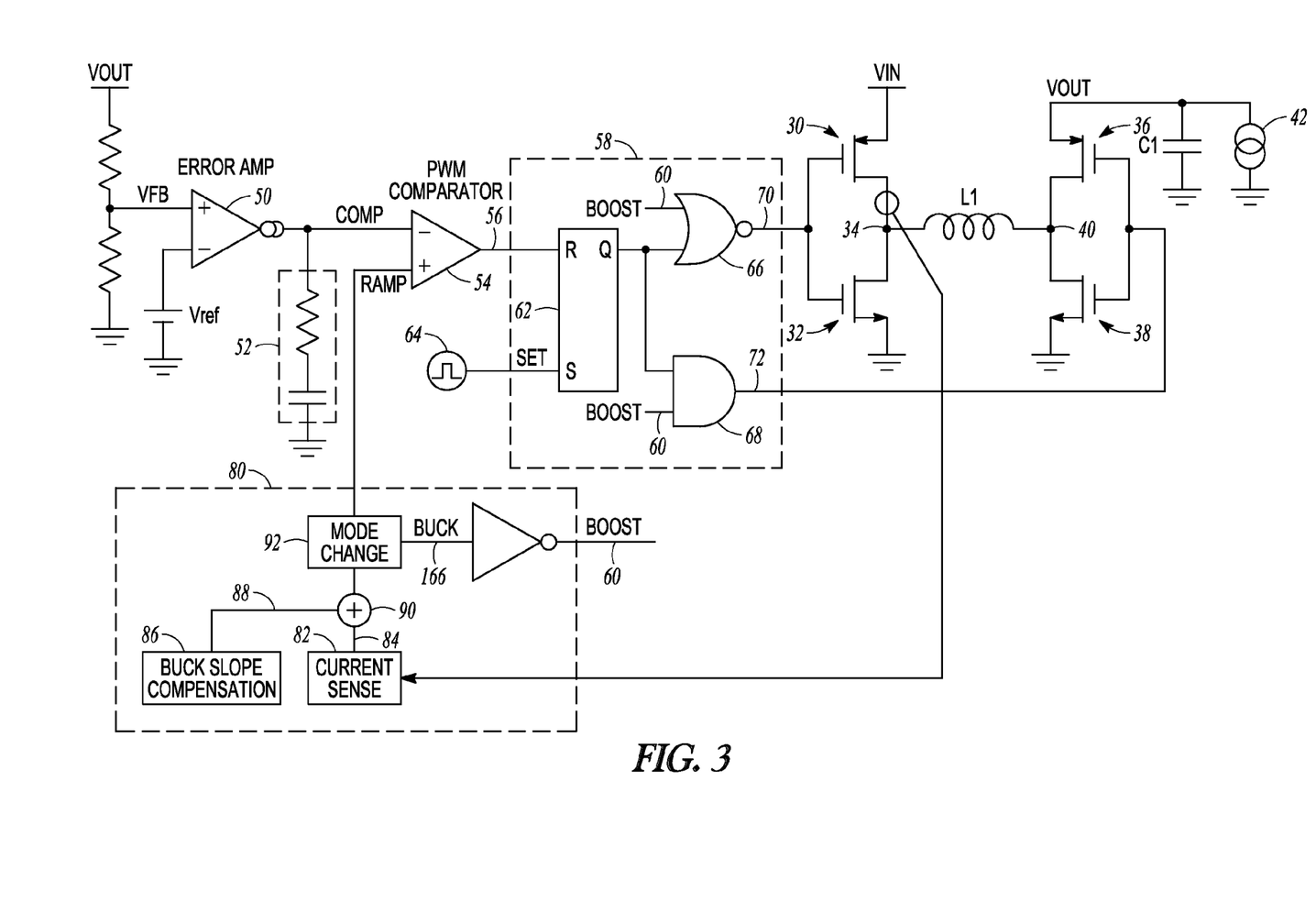
FIG. 3 is a block/schematic diagram illustrating one possible embodiment of a windowless buck-boost switching converter per the present invention.

A block/schematic diagram of an exemplary embodiment of the present windowless buck-boost converter is shown in FIG. 3. The converter includes primary high and low side switching elements 30, 32 connected together at a node 34, secondary high and low side switching elements 36, 38 connected together at a node 40, and inductor L1, with the switching elements and inductor arranged in an H-bridge configuration. Here, switching elements 30, 32, 36, 38 are realized with PMOS and NMOS FETs, though other switching devices might also be used. The top of primary high side switching element 30 is the input node for the converter and receives an input voltage VIN, and the top of secondary high side switching element 36 is the converter's output node at which output voltage VOUT is provided. Filter capacitor C1 would typically be connected between VOUT and a circuit common point; VOUT is suitably connected to a load 42.

The converter also includes a regulation circuit arranged to operate the primary or secondary high and low side switching elements to produce a desired output voltage VOUT. The regulation circuit includes an error amplifier 50 (which may include compensation circuitry 52) arranged to produce a 'comp' signal which varies with the difference between a voltage VFB proportional to VOUT and a reference voltage Vref, and a first comparison circuit 54 which compares the 'comp' signal with a 'ramp' signal and toggles an output 56 when the 'ramp' signal increases above or falls below the 'comp' signal. Logic circuitry 58 receives the output 56 of the comparison circuit and a mode control signal 60 indicating whether the converter is to operate in buck mode or boost mode; the logic circuitry is arranged to operate primary high and low side switching elements 30, 32 to produce the desired VOUT voltage when mode control signal 60 indicates buck mode operation, and to operate secondary high and low side switching elements 36, 38 to produce the desired VOUT voltage when mode control signal 60 indicates boost mode operation. The switching elements are switched on and off during an associated switching cycle, and have associated 'on' and 'off' times. As used herein, a pair of switching elements are 'operated' when they are switched on and off in complementary fashion to regulate VOUT, typically using PWM signals. Note that when in buck mode, switching element 40 is on continuously, to provide a conductive path from inductor L1 to the output node (VOUT); similarly, when in boost mode, switching element 30 is on continuously, to provide a conductive path from inductor L1 to the input node (VIN).

Logic circuit 58 would typically include an SR latch 62, which is set on the rising edge of a periodic clock signal 64 'set'. The Q output of latch 62 is provided to logic gates 66 and 68, each of which receive mode control signal 60. In this example, logic gate 66 is a NOR gate and logic gate 68 is an AND gate. If mode control signal 60 is low indicating buck mode operation: when latch 62 is set and Q goes high, NOR gate output 70 goes low, primary high side switching element 30 is switched on and low side switching element 32 is switched off. When the 'ramp' signal exceeds the 'comp' signal, the output 56 of comparison circuit 54 goes high, resetting latch 62 and causing primary high side switching element 30 to be switched off and low side switching element 32 to be switched on. Switching elements 30 and 32 are switched on and off in this way as needed to regulate VOUT.

With respect to the secondary side in buck mode, the output 72 of AND gate 68 remains low as long as mode control signal 60 is low, such that secondary high side switching element 36 is always on (thereby providing a conductive path from L1 to VOUT) and low side switching element 38 is always off.

If mode control signal 60 is high indicating boost mode operation: when latch 62 is set and Q goes high, AND gate output 70 goes high, secondary high side switching element 36 is switched off and low side switching element 38 is switched on. When the 'ramp' signal exceeds the 'comp' signal, the output 56 of comparison circuit 54 goes high, resetting latch 62 and causing secondary high side switching element 36 to be switched on and low side switching element 38 to be switched off. Switching elements 36 and 38 are switched on and off in this way as needed to regulate VOUT.

With respect to the primary side in boost mode, the output 70 of NOR gate 66 remains low as long as mode control signal 60 is high, such that primary high side switching element 30 is always on (thereby providing a conductive path from L1 to VIN) and low side switching element 32 is always off.

The converter also includes a ramp signal generation circuit 80, which includes a current sensing circuit 82 that provides an output 84 which varies with the current conducted by one of the high side switching elements (here, primary high side switching element 30), slope compensation and/or boost offset circuitry 86 which produces an output 88 that is summed with the current sensing circuit output at a summing node 90, and a mode change circuit 92 which produces the 'ramp' signal and generates mode control signal 60 and a complementary mode control signal 166. For the examples described herein, the converter operates in buck mode when mode control 60 is high, and in boost mode when mode control signal 166 is high; note, however, that the converter could be easily adapted for use with mode control signals of opposite polarities.

Figure 4:
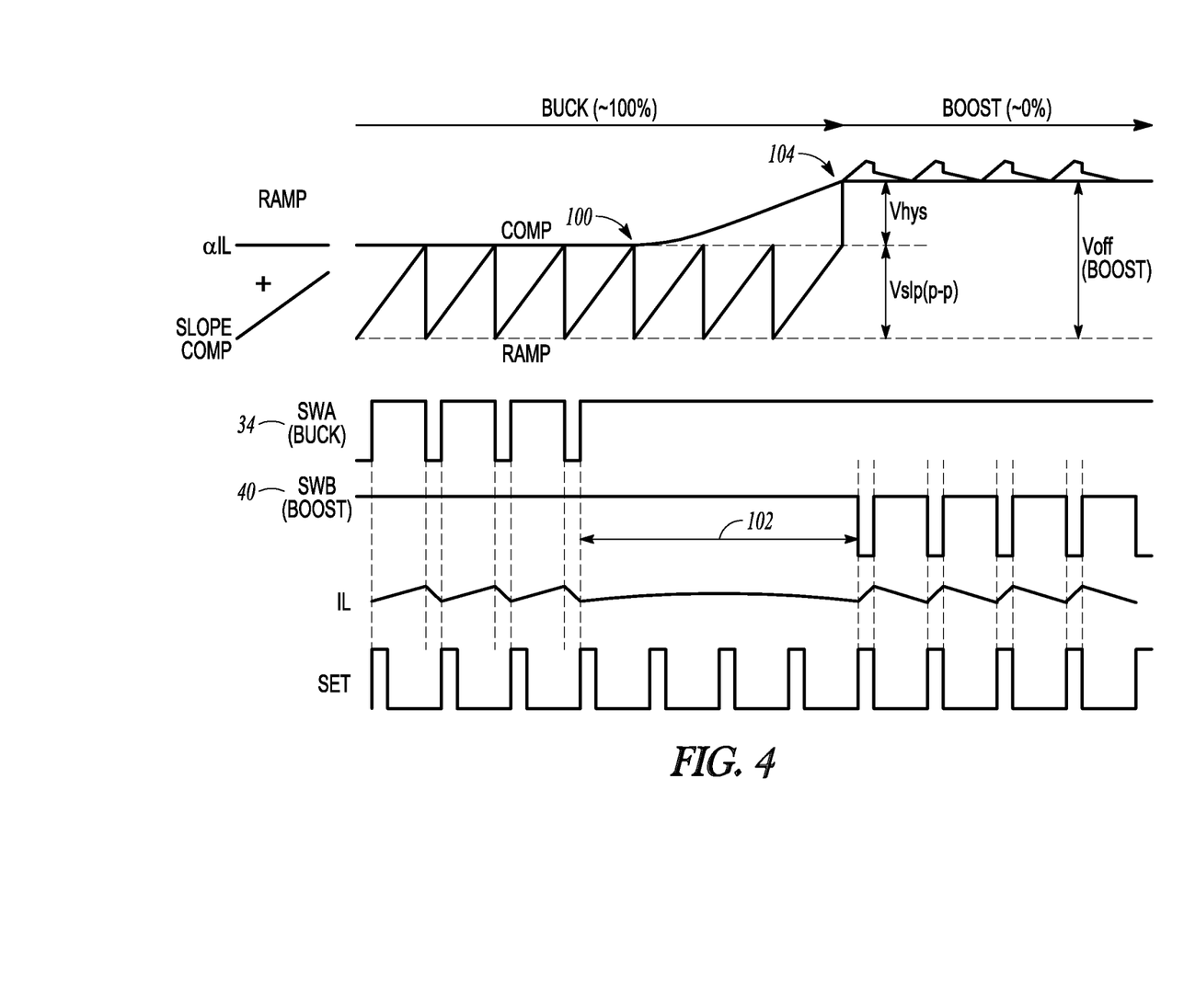
FIG. 4 is a timing diagram illustrating a buck mode to boost mode transition for a windowless buck-boost switching converter per the present invention.

Ramp signal generation circuit 80 is arranged to shift the 'ramp' signal up when transitioning from buck to boost mode, and to shift 'ramp' back down when transitioning from boost to buck mode, which enables the 'comp' voltage to remain relatively constant during mode transitions. A transition from buck to boost mode is illustrated in FIG. 4. The diagram includes the periodic 'set' signal provided to latch 62, the sensed inductor current IL, the voltages at nodes 34 (SWA) and 40 (SWB), the 'ramp' signal and the 'comp' signal. The 'ramp' signal is the sum of a signal proportional to the inductor current (proportional to IL) and the slope compensation signal (which has an amplitude Vslp(p–p)), and has a slope equal to that of the slope compensation signal.

Assume that the system is in buck mode. At first, the 'ramp' signal reaches the 'comp' signal during every cycle, causing PWM pulses (SWA) to be delivered to the primary high and low side switching elements. However, if input voltage VIN begins to decrease, output voltage VOUT will decrease as well, causing 'comp' to increase. As 'comp' increases, the buck mode duty cycle (given by VOUT/VIN) eventually increases to near 100%, the slope of the sensed inductor current IL (proportional to VIN-VOUT) falls to near 0, and the 'ramp' signal can no longer reach the 'comp' signal; at this point (100), the PWM pulses are suspended (102). If 'comp' becomes greater than 'ramp' plus a hysteresis voltage Vhys (104), suitably 10-100 mv, the transition to boost mode is made. This is accomplished by shifting the 'ramp' signal up by a voltage Voff(boost) which is given by Vslp(p–p)+Vhys. After the transition, the boost mode duty cycle, given by 1-VIN/VOUT, is around 0%, and PWM pulses (SWB) are delivered to the secondary high and low side switching elements.

By shifting the 'ramp' signal up at the transition point in this way, the 'ramp' signal valley comes to just below the 'comp' signal, such that the duty cycle does not vary much after the transition. This can minimize output voltage ripple at the mode transition.

Figure 5:
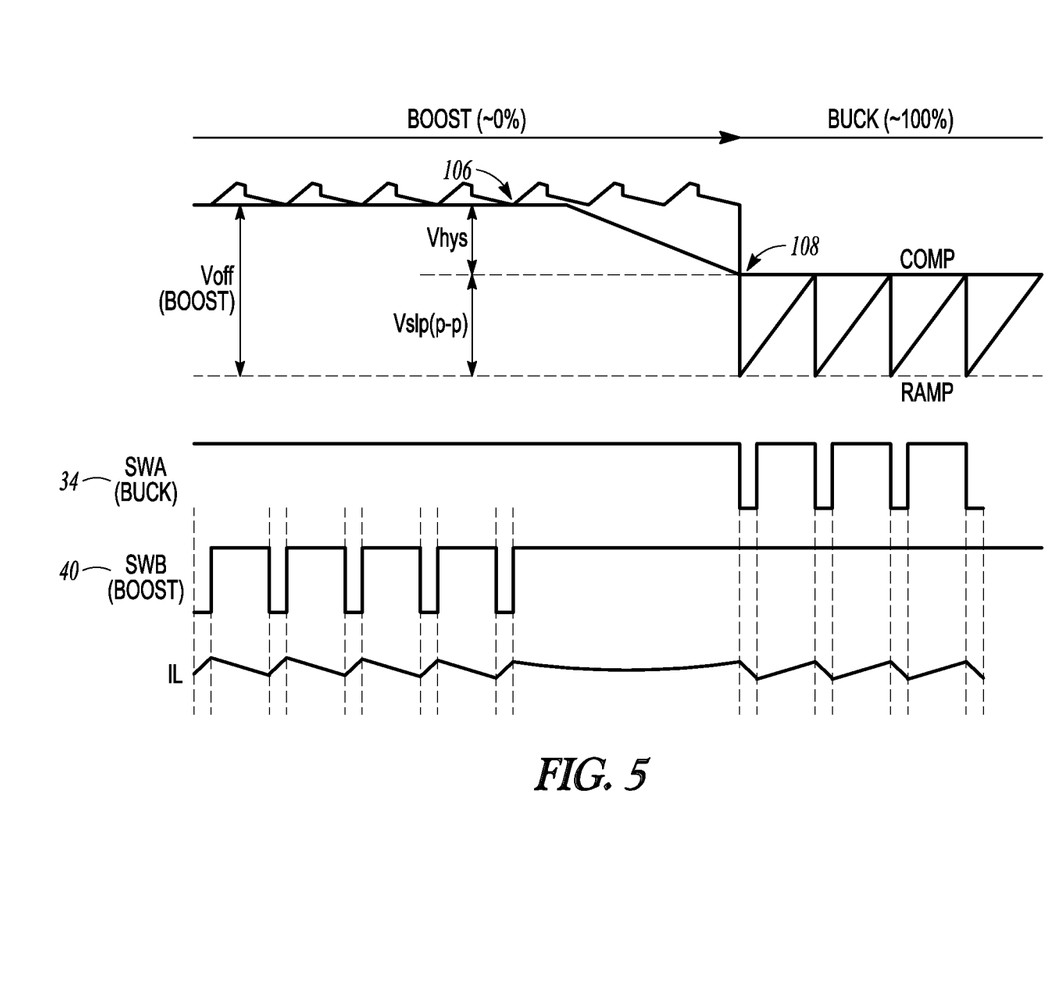
FIG. 5 is a timing diagram illustrating a boost mode to buck mode transition for a windowless buck-boost switching converter per the present invention.

A transition from boost to buck mode is illustrated in FIG. 5. Here, a transition is necessitated when the output voltage increases and the 'comp' signal decreases. The boost mode duty cycle eventually decreases to near 0%, the slope of the sensed inductor current IL falls to near 0, and the 'ramp' signal valley no longer reaches the 'comp' signal (106). If 'comp' becomes less than 'ramp' minus hysteresis voltage Vhys (108), the transition to buck mode is made. This is accomplished by shifting the 'ramp' signal down by voltage Voff(boost)=Vslp(p–p)+Vhys. After the transition, the buck mode duty cycle is around 100%.

One way of implementing the present windowless buck-boost converter is to generate two ramp voltages 'ramph' and 'rampl', with 'ramph' being equal to 'rampl'+Vhys, and then using 'rampl' as the 'ramp' signal which is compared with the 'comp' signal when in buck mode, and using 'ramph' as the 'ramp' signal when in boost mode. Exemplary embodiments of current sense circuit 82, slope compensation and boost offset circuit 86, and mode change circuit 92 which implement this approach are shown in FIG. 6.

Current sense circuit 82 may be implemented with an amplifier 110 (typically a voltage-to-current (V-to-I) converter), the inputs of which are connected across one of the high side switching elements—here, primary high side switching element 30. Current sense circuit 82 produces an output 112 which varies with the current conducted by primary high side switching element 30; current sense output 112 is coupled to summing node 90.

Figure 6:
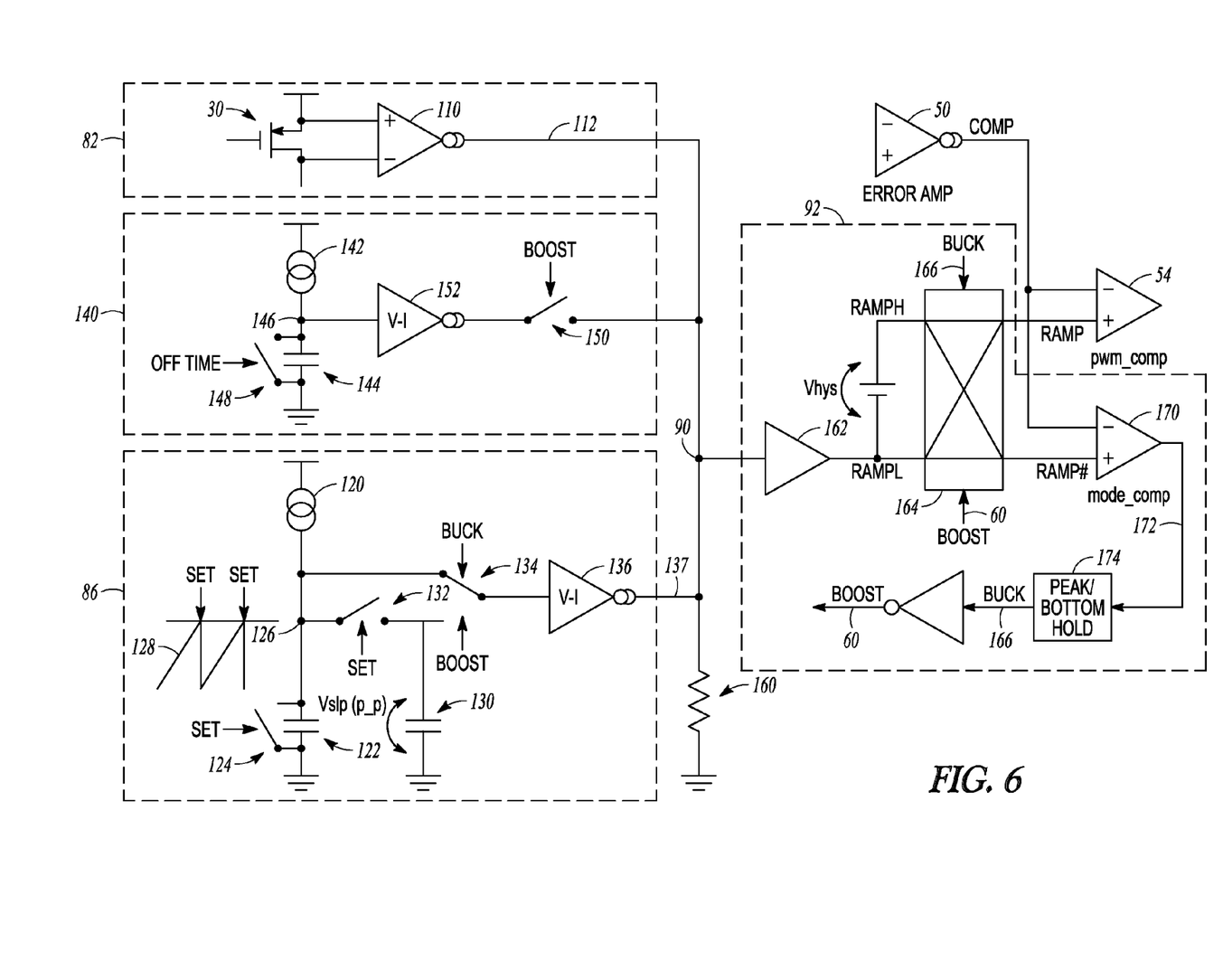
FIG. 6 is a block/schematic diagram of a current sensing circuit, slope compensation and offset circuit, and mode change circuit as might be used with a windowless buck-boost switching converter per the present invention.

For the exemplary implementation of slope compensation and boost offset circuit 86 shown in FIG. 6, a fixed current source 120 is connected in series with a capacitor 122, and a switch 124 is connected across capacitor 122 which is closed when the 'set' signal is asserted. This arrangement operates to provide a sawtooth waveform at a node 126 that serves as a slope compensation signal 128.

The circuit also suitably includes a capacitor 130 connected to node 126 via a 'set'-operated switch 132. This arrangement operates as a slope amplitude sample-and-hold, which stores the peak of the slope compensation signal at node 126 on capacitor 130. A switch 134 operates to connect the slope compensation signal to summing node 90 when the converter is operating in buck mode, and to connect the sample-and-hold output to summing node 90 when the converter is operating in boost mode. A V-to-I converter 136 may be connected at its input to switch 134, and used to convert the voltage at its input to a current 137 which is provided to summing node 90.

For some applications, it may be necessary to provide boost slope compensation. One arrangement that could be used for this purpose is circuitry 140, which includes a fixed current source 142 connected in series with a capacitor 144 at a node 146, with a switch 148 that is closed during the converter's 'off' time connected across capacitor 144. Node 146 is coupled to summing node 90 via a switch 150 which is closed when in boost mode. A V-to-I converter 152 may be used to convert the voltage at node 146 to a current suitable for delivery to summing node 90.

A resistor 160 is suitably connected between summing node 90 and a circuit common point to convert the summed currents into a voltage; this voltage, which may be buffered with a buffer 162, is voltage 'rampl'. A fixed voltage Vhys is referenced to voltage 'rampl' to produce voltage 'ramph', which is given by 'rampl'+Vhys. A switching circuit 164 is arranged to receive the 'rampl' and 'ramph' signals, along with mode control signals 60 and 166. Switching circuit 164 provides voltage 'rampl' to comparison circuit 54 (pwm_comp) as signal 'ramp' when the mode control signals indicate buck mode operation, and provides voltage 'ramph' to comparison circuit 54 as signal 'ramp' when the mode control signals indicate boost mode operation.

To determine the converter's operating mode, a second comparison circuit 170 (mode_comp) is preferably used, which compares the 'comp' signal with a 'ramp#' signal and toggles an output 172 when 'ramp#' increases above or falls below 'comp'. Switching circuit 164 is preferably further arranged to provide voltage 'rampl' to second comparison circuit 170 as signal 'ramp#' when the mode control signals indicate boost mode operation, and to provide voltage 'ramph' to the second comparison circuit as signal 'ramp#' when the mode control signals indicate buck mode operation. Logic circuitry 174 is arranged to receive the output 170 of the second comparison circuit and to provide mode control signals 166 and 60 in response.

Figure 7:
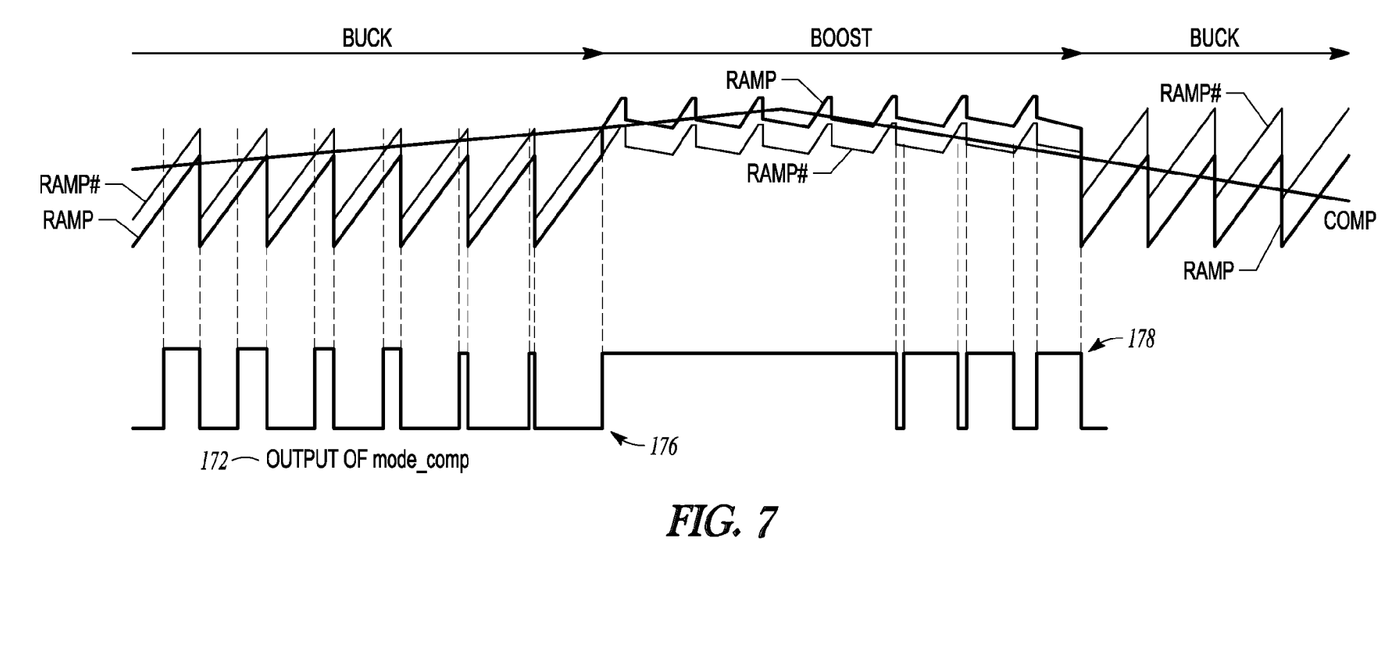
FIG. 7 is a diagram illustrating the operation of 'ramp' and 'ramp#' signals associated with a windowless buck-boost switching converter per the present invention.

An illustration of the operation of the 'ramp' and 'ramp#' signals is shown in FIG. 7. Initially, the converter is operating in buck mode; as such, 'rampl' is provided to the pwm_comp comparison circuit as signal 'ramp', and 'ramph' is provided to the mode_comp comparison circuit as signal 'ramp#'. As long as 'ramp#' exceeds 'comp' during each cycle, the converter will remain in buck mode. However, if the output 172 of the mode_comp comparison circuit is low (176) at a peak of the 'ramp#' signal, this indicates that 'ramp#' failed to reach the 'comp' signal, and thus the converter should transition to boost mode.

With the converter operating in boost mode, 'rampl' is provided to the mode_comp comparison circuit as signal 'ramp#', and 'ramph' is provided to the pwm_comp comparison circuit as signal 'ramp'. As long as the valley of 'ramp#' falls below 'comp' during each cycle, the converter will remain in buck mode. However, if the output 172 of the mode_comp comparison circuit is high (178) at a valley of the 'ramp#' signal, this indicates that 'ramp#' failed to fall below the 'comp' signal, and thus the converter should transition back to buck mode. To summarize, during buck mode, 'ramp'='rampl' and 'ramp#'='ramph', and during boost mode, 'ramp'='ramph' and 'ramp#'='rampl'.

Figure 8:
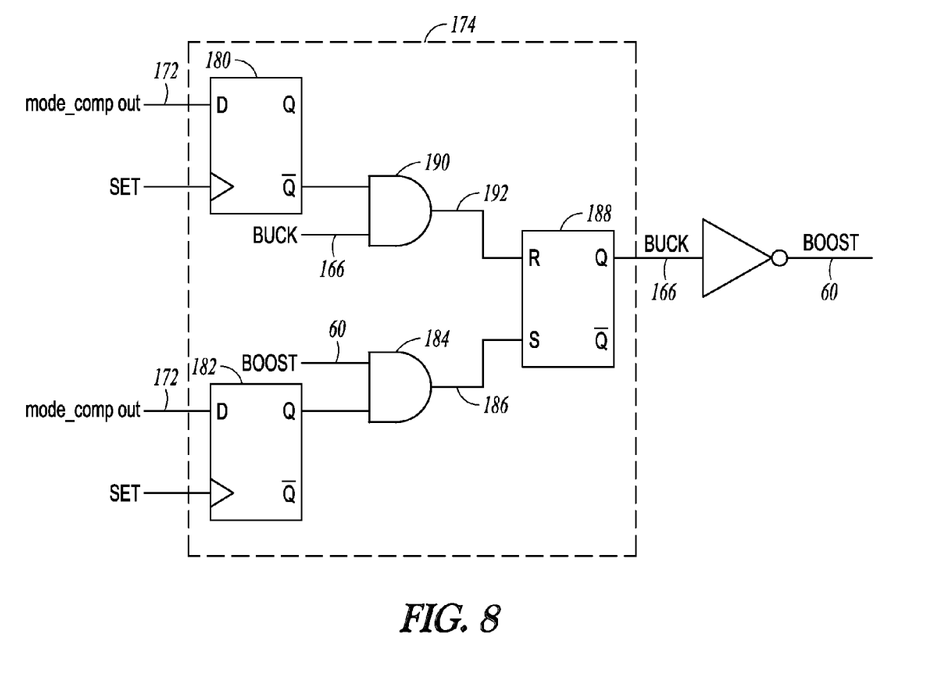
FIG. 8 is a schematic diagram of one possible embodiment of a logic circuit which produces a mode control signal for a windowless buck-boost switching converter per the present invention.

One possible implementation for logic circuit 174 is shown in FIG. 8. D flip-flops 180, 182 each receive the output 172 of the mode_comp comparison circuit at their data inputs, and the 'set' signal at their clock inputs. The Q output of flip-flop 182 is gated (184) with mode control signal 60 (boost), with the result 186 provided to the 'set' input of an SR latch 188, and the $\overline{Q}$ output of flip-flop 180 is gated (190) with mode control signal 166 (buck), with the result 192 provided to the 'reset' input of the SR latch. In operation, if in buck mode and the output 172 of the mode_comp comparison circuit is low when 'set' pulses, the $\overline{Q}$ output of flip-flop 180 goes high, causing SR latch 188 to reset, such that mode control signal 166 (buck) goes low and mode control signal 60 (boost) goes high—signaling the converter to transition to boost mode. Similarly, if in boost mode and the output 172 of the mode_comp comparison circuit is high when 'set' pulses, the Q output of flip-flop 182 goes high, causing SR latch 188 to be set, such that mode control signal 166 (buck) goes high and mode control signal 60 (boost) goes low—signaling the converter to transition to buck mode.

Figure 9:
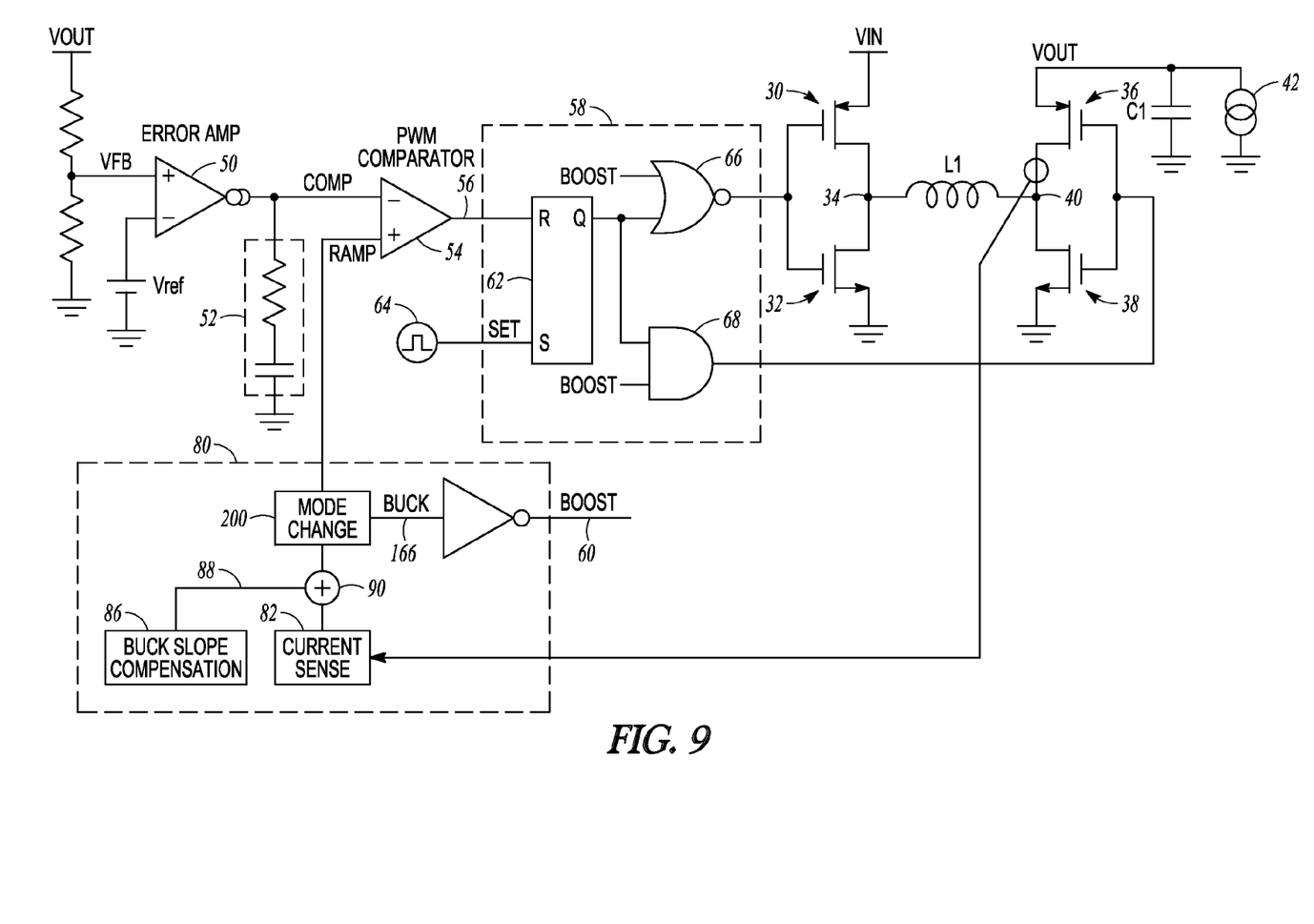
FIG. 9 is a block/schematic diagram illustrating another possible embodiment of a windowless buck-boost switching converter per the present invention.

Though the examples above depict the sensed current being that in the primary high side switching element, the present windowless buck-boost converter can also be arranged such that the current in the secondary high side switching element is sensed instead. The transition method between buck and boost remains as described above, but in boost mode the converter employs an emulated peak current mode control scheme. An exemplary implementation of such a converter is shown in FIG. 9. The circuit blocks are the same as in FIG. 3, except that the mode change block 200 now includes circuitry to generate an emulated current signal in boost mode (discussed below), and current sense circuit 82 is arranged to sense the current in secondary high side switching element 36 instead of primary high side switching element 30.

Figure 10:
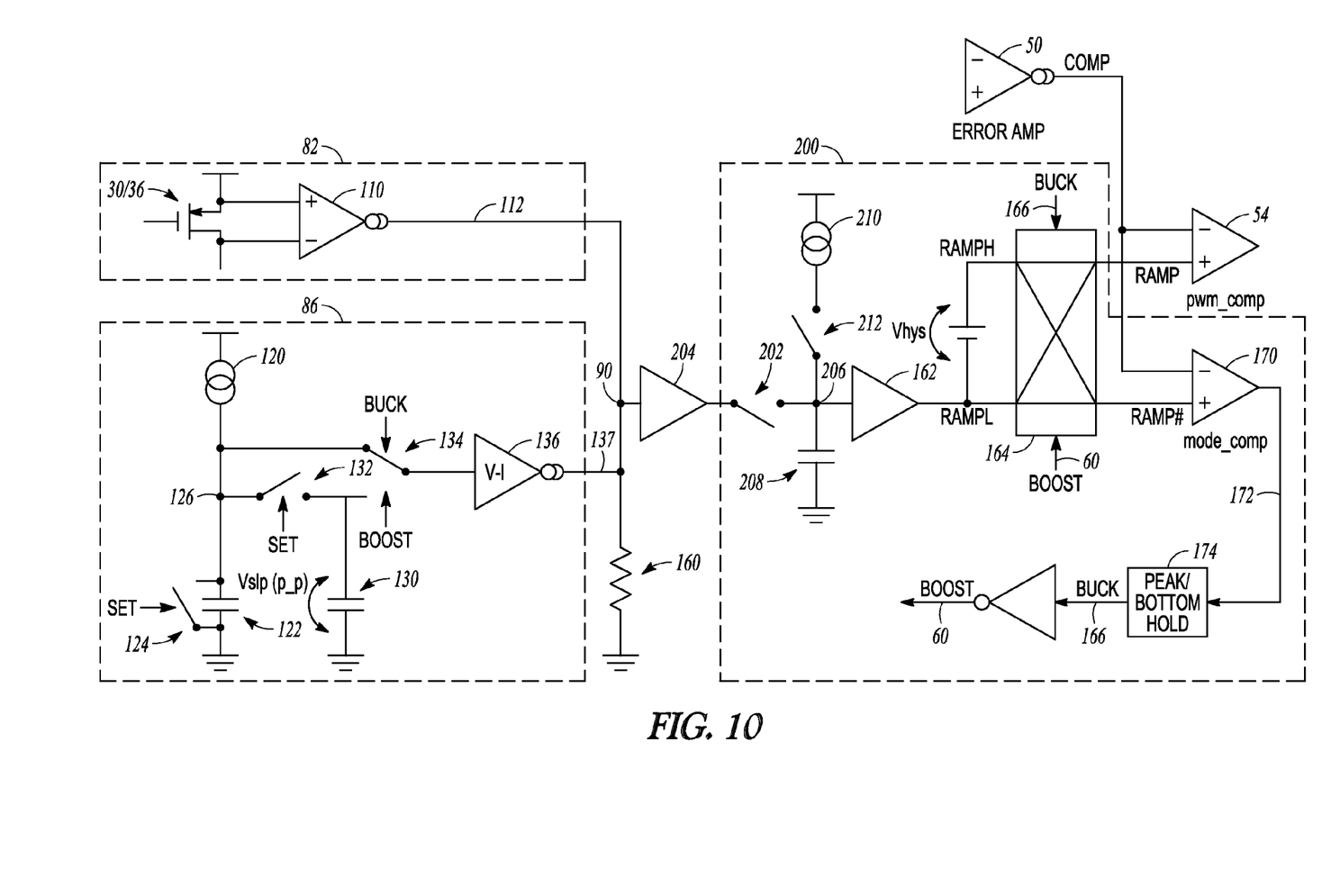
FIG. 10 is a block/schematic diagram of a current sensing circuit, slope compensation and offset circuit, and mode change circuit as might be used with the windowless buck-boost switching converter of FIG. 9.

Exemplary embodiments of current sense circuit 82, slope compensation and boost offset circuit 86, and mode change circuit 200 which implement the approach depicted in FIG. 9 are shown in FIG. 10. Current sense circuit 82 is as before, with an amplifier 110 connected across primary or secondary high side switching element 30 or 36, and producing a current 112 which varies with the sensed current. Slope compensation and offset circuit 86 is also as before, providing the slope compensation signal at node 126 to summing node 90 when the converter is operating in buck mode, and the output of sample-and-hold capacitor 130 to summing node 90 when the converter is operating in boost mode, preferably as a current 137.

Mode change circuit 200 is also similar to that of mode change circuit 92, except for the addition of circuitry to generate an emulated current signal in boost mode. In this example, the additional circuit comprises a switch 202 connected between summing node 90 (or, preferably, the output of a buffer 204) and a node 206, a capacitor 208 connected between node 206 and circuit common, a fixed current source 210, and a switch 212 connected between the output of current source 210 and node 206. In operation, if in buck mode, switch 202 is always closed and switch 212 is always open, so that the converter operates as before. If in boost mode, switch 202 is closed during the converter's 'off' time and open during the converter's 'on' time, and switch 212 is closed during the converter's 'on' time and open during the converter's 'off' time, such that an emulated current is summed with the signal at summing node 90 in boost mode.

The converter can be arranged such that, in buck mode, the current in either the primary or secondary high side switching element can be sensed, with regulation provided with a true peak current mode control scheme. In boost mode, if the current in the primary high side switching element is sensed, regulation can be either true or emulated peak current mode. If the current in the secondary high side switching element is sensed, boost mode regulation must be accomplished with emulated peak current mode.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

I claim:

1. A windowless H-bridge switching converter, comprising:
    primary high and low side switching elements;
    secondary high and low side switching elements;
    an inductor, said primary and secondary high and low side switching elements and said inductor arranged in an H-bridge configuration, the top of said primary high side switching element being the input node for said converter and the top of said secondary high side switching element being the output node for said converter;
    a regulation circuit arranged to operate said primary or secondary high and low side switching elements to produce a desired output voltage at said output node, said regulation circuit comprising:
  an error amplifier arranged to produce a 'comp' signal which varies with the difference between a voltage proportional to said output voltage and a reference voltage;
  a first comparison circuit which compares said 'comp' signal with a 'ramp' signal and toggles an output when said 'ramp' signal increases above or falls below said 'comp' signal; and
  first logic circuitry arranged to receive the output of said comparison circuit and a mode control signal indicating whether said converter is to operate in buck mode or boost mode, said first logic circuitry arranged to operate said primary high and low side switching elements to produce said desired output voltage when said mode control signal indicates buck mode operation and to operate said secondary high and low side switching elements to produce said desired output voltage when said mode control signal indicates boost mode operation, said switching elements operated during an associated switching cycle and having associated 'on' and 'off' times;
  a ramp signal generation circuit, comprising:
    a current sensing circuit which provides an output which varies with the current conducted by one of said high side switching elements;
    slope compensation and/or boost offset circuitry which produces an output that is summed with the output of said current sensing circuit at a summing node to produce a voltage 'rampl';
    a fixed voltage (Vhys) which is referenced to said voltage 'rampl' to produce a voltage 'ramph' given by 'rampl' +Vhys;
    a switching circuit arranged to provide said voltage 'rampl' to said first comparison circuit as said signal 'ramp' when said mode control signal indicates buck mode operation and to provide said voltage 'ramph' to said first comparison circuit as said signal 'ramp' when said mode control signal indicates boost mode operation;
  a second comparison circuit which compares said 'comp' signal with a 'ramp#' signal and toggles an output when said 'ramp#' signal increases above or falls below said 'comp' signal, said switching circuit further arranged to provide said voltage 'rampl' to said second comparison circuit as said signal 'ramp#' when said mode control signal indicates boost mode operation and to provide said voltage 'ramph' to said second comparison circuit as said signal 'ramp#' when said mode control signal indicates buck mode operation; and
  second logic circuitry arranged to receive the output of said second comparison circuit and to provide said mode control signal in response.

2. The switching converter of claim 1, wherein said first logic circuitry comprises:
  a SR latch which receives a periodic clock signal at its 'set' input and the output of said first comparison circuit at its 'reset' input and which produces at least one output having a first state when said latch is set and a second state when said latch is reset; and
  logic gates which receive said at least one latch output and said mode control signal, and are arranged to, when said mode control signal indicates buck mode operation, turn on and turn off said primary high side switching element and turn off and turn on said primary low side switching element when said latch is set and reset, respectively, and when said mode control signal indicates boost mode operation, turn off and turn on said secondary high side switching element and turn on and turn off said secondary low side switching element when said latch is set and reset, respectively.

3. The switching converter of claim 1, wherein said second logic circuitry is arranged such that, if operating in buck mode and the output of said second comparison circuit indicates that 'ramp#' <comp when a periodic clock signal pulses, said mode control signal is set to indicate boost mode operation, and such that, if operating in boost mode and the output of said second comparison circuit indicates that 'ramp#' >comp when said periodic clock signal pulses, said mode control signal is set to indicate buck mode operation.

4. The switching converter of claim 1, wherein said slope compensation and/or offset circuitry comprises:
  a current source which provides an output current at a first node;
  a first capacitor connected between said first node and a circuit common point and arranged to be charged by said output current; and
  a first switch arranged to discharge said first capacitor when closed in response to a periodic clock signal, said current source, first capacitor and first switch producing a slope compensation signal at said first node which is summed with the output of said current sensing circuit when said converter is operating in buck mode.

5. The switching converter of claim 4, wherein said slope compensation and/or offset circuitry further comprises:
  a second capacitor connected between a second node and said circuit common point; and
  a second switch connected between said first node and said second node which is closed in response to said periodic clock signal, said current source, first capacitor, first switch, second capacitor and second switch producing a sample and hold signal at said second node which is summed with the output of said current sensing circuit when said converter is operating in boost mode.

6. The switching converter of claim 5, further comprising:
  a voltage-to-current (V-to-I) converter;
  a third switch arranged to connect said first node to the input of said V-to-I converter when said converter is operating in buck mode and to connect said second node to the input of said V-to-I converter when said converter is operating in boost mode, the current output of said V-to-I converter connected to said summing node.

7. The switching converter of claim 1, further comprising a resistance connected between said summing node and a circuit common point.

8. The switching converter of claim 1, wherein said current sensing circuit is arranged to provide an output which varies with the current conducted by said primary high side switching element.

9. The switching converter of claim 8, wherein said regulation circuit is arranged to operate said converter in true peak current mode.

10. The switching converter of claim 8, wherein said regulation circuit is arranged to operate said converter in true peak current mode when said converter is operating in buck mode and in true peak current mode or emulated peak current mode when said converter is operating in boost mode.

11. The switching converter of claim 1, wherein said current sensing circuit is arranged to provide an output which varies with the current conducted by said secondary high side switching element.

12. The switching converter of claim 11, wherein said regulation circuit is arranged to operate said converter in true peak current mode when said converter is operating in buck mode and in emulated peak current mode when said converter is operating in boost mode.

13. The switching converter of claim 1, further comprising:
a first switch connected between said summing node and a first node;
a fixed current source which provides an output current;
a second switch connected between said output current and said first node; and
a capacitor connected between said first node and a circuit common point and arranged to be charged by said output current when said second switch is closed;
said first switch arranged to be closed continuously when said converter is operating in buck mode and to be closed during said 'off' times when said converter is operating in boost mode;
said second switch arranged to be open continuously when said converter is operating in buck mode and to be open during said 'on' times when said converter is operating in boost mode, such that said converter operates in emulated peak current mode when in said boost mode;
said voltage 'rampl' coupled to said first node.

14. A method of controlling the transition between buck and boost operating modes for a buck-boost current mode switching converter having primary and secondary high and low side switching elements and an inductor arranged in an H-bridge configuration, the top of said secondary high side switching element being the output node for said converter, said primary or secondary high and low side switching elements operated with respective modulated switching signals to regulate a desired output voltage (VOUT) produced at said output node, said method comprising:
sensing the current conducted by one of said high side switching elements;
comparing a signal 'comp' that varies with the difference between a reference voltage and a voltage proportional to VOUT and a signal 'ramp';
using the result of said comparison to control the regulation of said output voltage;
summing said sensed current with a slope compensation signal and/or a boost offset signal to produce a voltage 'rampl';
adding a voltage Vhys to 'rampl' to produce a voltage 'ramph';
generating a mode control signal which indicates whether said converter is to operate in buck mode or boost mode; and
providing said voltage 'rampl' as said signal 'ramp' when said mode control signal indicates buck mode operation and providing said voltage 'ramph' as said signal 'ramp' when said mode control signal indicates boost mode operation.

15. The method of claim 14, wherein generating said mode control signal comprises:
generating a voltage 'ramp#' ='rampl' when said mode control signal indicates boost mode operation and generating said voltage 'ramp#' ='ramph' when said mode control signal indicates buck mode operation;
comparing said 'comp' signal with said 'ramp#' signal;
setting said mode control signal to indicate boost mode operation if operating in buck mode and 'ramp#' <comp when a periodic clock signal pulses; and
setting said mode control signal to indicate buck mode operation if operating in boost mode and 'ramp#' >comp when said periodic clock signal pulses.

16. The method of claim 14, wherein said sensed current is summed with said slope compensation signal to produce said voltage 'rampl' if operating in buck mode, and said sensed current is summed with a signal representing the peak voltage of said slope compensation signal to produce said voltage 'rampl' if operating in boost mode.

* * * * *